United States Patent [19]

Hirai

[11] Patent Number: 5,267,048
[45] Date of Patent: Nov. 30, 1993

[54] APPARATUS HAVING A FUNCTION TO STORE RECEIVED DATA IN AN UNLOADABLE EXTERNAL STORAGE MEDIUM

[75] Inventor: Nobuyuki Hirai, Yokohama, Japan

[73] Assignee: Canon Kabushiki Kaisha, Tokyo, Japan

[21] Appl. No.: 707,034

[22] Filed: May 29, 1991

[30] Foreign Application Priority Data

Jun. 1, 1990 [JP] Japan .................. 2-144028

[51] Int. Cl.$^5$ ................... H04N 1/40; H04N 1/21
[52] U.S. Cl. .................. 358/404; 358/437; 358/441
[58] Field of Search ......... 358/400, 404, 444, 403, 358/406, 437, 441, 442

[56] References Cited

U.S. PATENT DOCUMENTS

| | | | |
|---|---|---|---|
| 4,717,967 | 1/1988 | Yoshida | 358/296 |
| 4,774,590 | 9/1988 | Haganuma et al. | 358/444 |
| 4,789,900 | 12/1988 | Takahashi | 358/439 |
| 4,814,890 | 3/1989 | Kato | 379/100 |
| 4,827,349 | 5/1989 | Ogata et al. | 358/434 |
| 4,829,385 | 5/1989 | Takezawa | 358/433 |
| 4,900,902 | 2/1990 | Sakakibara | 235/375 |
| 4,907,094 | 3/1990 | Mishima et al. | 358/437 |
| 4,910,785 | 3/1990 | Nakatsuma | 382/9 |
| 4,922,349 | 5/1990 | Abe et al. | 358/443 |

FOREIGN PATENT DOCUMENTS

| | | | |
|---|---|---|---|
| 58-159065A | 9/1983 | Japan | 358/406 |
| 0163953 | 7/1991 | Japan | |

Primary Examiner—Edward L. Coles, Sr.
Assistant Examiner—Jerome Grant
Attorney, Agent, or Firm—Fitzpatrick, Cella, Harper & Scinto

[57] ABSTRACT

An image communication apparatus stores received image data in a first memory, such as its hard disk drive, and transfers the image data stored in the first memory to a second, unloadable memory, such as a floppy disk, that may be unloaded to or unloaded from the apparatus. The load/unload status of the floppy disk is detected, indicating whether it is loaded to or unloaded from the apparatus, and the controller controls the transfer of the image data from the hard disk to the floppy disk in accordance with this detection. Specifically, the controller interrupts the transfer of the image data when the unload status is detected during transfer of image data, and resumes the interrupted transfer when the load status is detected after the interruption. An alarm may be sounded when the transfer of the image data is interrupted to indicate to an operator that a floppy disk should be loaded.

13 Claims, 4 Drawing Sheets

APPARATUS HAVING A FUNCTION TO STORE RECEIVED DATA IN AN UNLOADABLE EXTERNAL STORAGE MEDIUM

BACKGROUND OF THE INVENTION

1. Field of the Invention

The present invention relates to an image communication apparatus having a function to store received image data in an unloadable external storage medium.

2. Related Background Art

A facsimile device has been known as an apparatus of this type. A facsimile device which stores received image information in a semiconductor memory has been known. When a volume of the image information to be received exceeds a memory capacity of the semiconductor memory, the semiconductor memory indicates an over-capacity and the reception is interrupted. Since the memory capacity of the semiconductor memory is usually small, the frequency of interruption of the reception due to the over-capacity is high. In order to lower the frequency of the interruption of the reception due to the over-capacity of the semiconductor memory, the received image information may be transferred to a floppy disk.

In such a prior art facsimile device, if the facsimile device is receiving information and the floppy disk is unloaded from a disk drive and not reloaded while the image information stored in the semiconductor memory is transferred to the floppy disk, the semiconductor memory is over the capacity if the volume of the received image information is larger than the vacant capacity of the semiconductor memory, and the reception is interrupted.

The following U.S. Patents and U.S. patent application relate to the memory reception: U.S. Pat. Nos. 4,717,967; 4,774,590; 4,789,900; 4,814,890; 4,827,349; 4,829,385; 4,900,902; 4,907,094; 4,910,785; 4,922,349 and Ser. No. 267,732 refiled on Nov. 3, 1988. However, none of them suggests a solution to the above problem.

SUMMARY OF THE INVENTION

It is an object of the present invention to improve an image communication apparatus, in the light of the above problem.

It is another object of the present invention to provide an image communication apparatus which automatically resumes the transfer of image data to an external storage medium by reloading of the external storage medium when the external storage medium is unloaded during the transmission of the image data to the external storage medium.

It is still another object of the present invention to provide an image communication apparatus which requests the reloading of the external storage medium to an operator when the external storage medium is unloaded during the transmission of image data stored in a memory built in the image communication apparatus into the external storage medium.

Other objects of the present invention will be apparent from the following detailed description of the embodiments and the drawings.

BRIEF DESCRIPTION OF THE DRAWINGS

FIGS. 4-1 to 4-4 show memory maps of a semiconductor memory in the embodiment.

DETAILED DESCRIPTION OF THE PREFERRED EMBODIMENTS

One embodiment of the present invention is now explained in detail with reference to the drawings.

Figure 1:
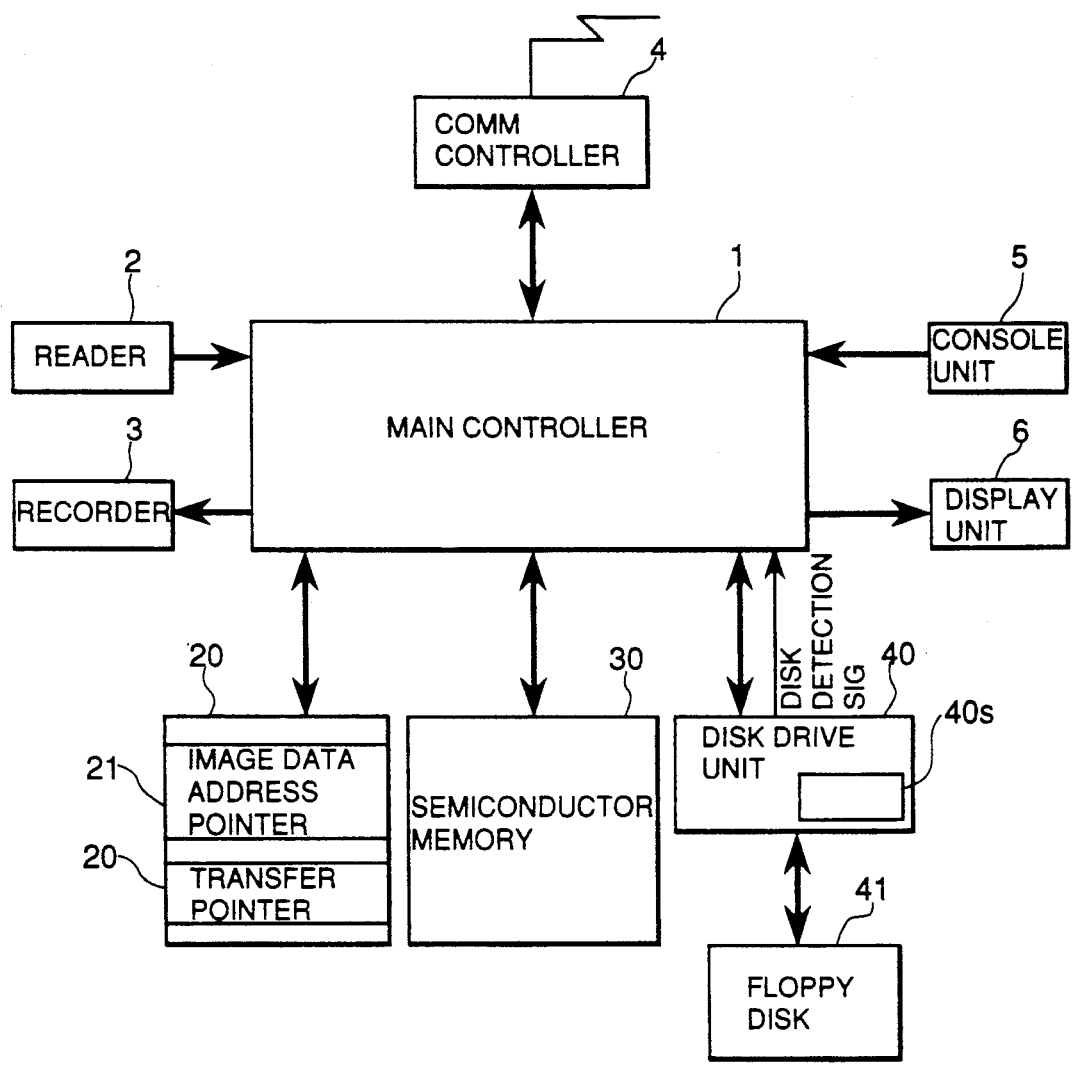
FIG. 1 shows a block diagram of a facsimile device in one embodiment of the present invention.

FIG. 1 shows a block diagram of the facsimile device in the present embodiment.

The facsimile device of the present embodiment comprises a main controller 1 which controls the overall operation of the facsimile device, a reader 2, a recorder 3, a communication controller 4, a console unit 5, a display 6, a control data memory 20, a semiconductor memory 30, a disk drive 40 and a floppy disk 41. The main controller 11 comprises a microcomputer, a ROM which stores a control program, a RAM and peripheral equipments.

The communication controller 4 comprises a modem and a network control unit (NCU).

The semiconductor memory 30 stores received image information by a command from the main controller 1, and it is an example of a first storage medium. The semiconductor memory 30 is a first-in first-out type memory and has a storage area thereof divided into a plurality of blocks of a predetermined size. The stored image information is block-transferred to the floppy disk 41 block by block.

The floppy disk 41 stores the image information which is block-transferred from the semiconductor memory 30 and it is an example of a second unloadable storage medium.

The disk-drive 40 has a load/unload sensor 40s which detects the load/unload status of the floppy disk and generates a load/unload signal. The main controller 1 determines the load/unload status of the floppy disk 41 by the load/unload signal from the sensor 40s. When the main controller 1 recognizes the unloading of the floppy disk 41 from the disk drive 40 during the transfer of the image information by the load/unload signal from the sensor 40s, it interrupts the transfer of the image information. Accordingly, the main controller 1 and the sensor 40s are examples of transfer interruption means which interrupts the transfer of the image information when the second storage medium is unloaded from the disk drive.

The display 6 may comprise an LCD and displays an operation status of the embodiment. During the interruption of the transfer of the image data, the display 6 generates a visual alarm to an operator. Accordingly, the display 6 is an example of alarm means which generates the alarm to the operator during the interruption of the transfer of the image information.

The control data memory 20 stores an image information memory address pointer 21 and a transfer pointer 22. The image information memory address pointer 21 points the next address to the address of the last stored image information.

The transfer pointer 22 points a start address of a block which is being transferred or waiting for the transfer. The image information stored in the block pointed by the transfer pointer 22 is transferred to the floppy disk 41.

When the floppy disk 41 is reloaded to the disk drive 40 after the interruption of the transfer of the image information, the main controller 1 recognizes the reloading of the floppy disk 41 by the load/unload signal from the sensor 40s and starts the transfer of the image information stored in the block pointed by the transfer pointer 22. Accordingly, the main controller 1, the memory 20 and the sensor 40s are examples of transfer start means for starting the transfer when the second storage medium is reloaded.

An operation of the embodiment is now explained.

Figure 2:
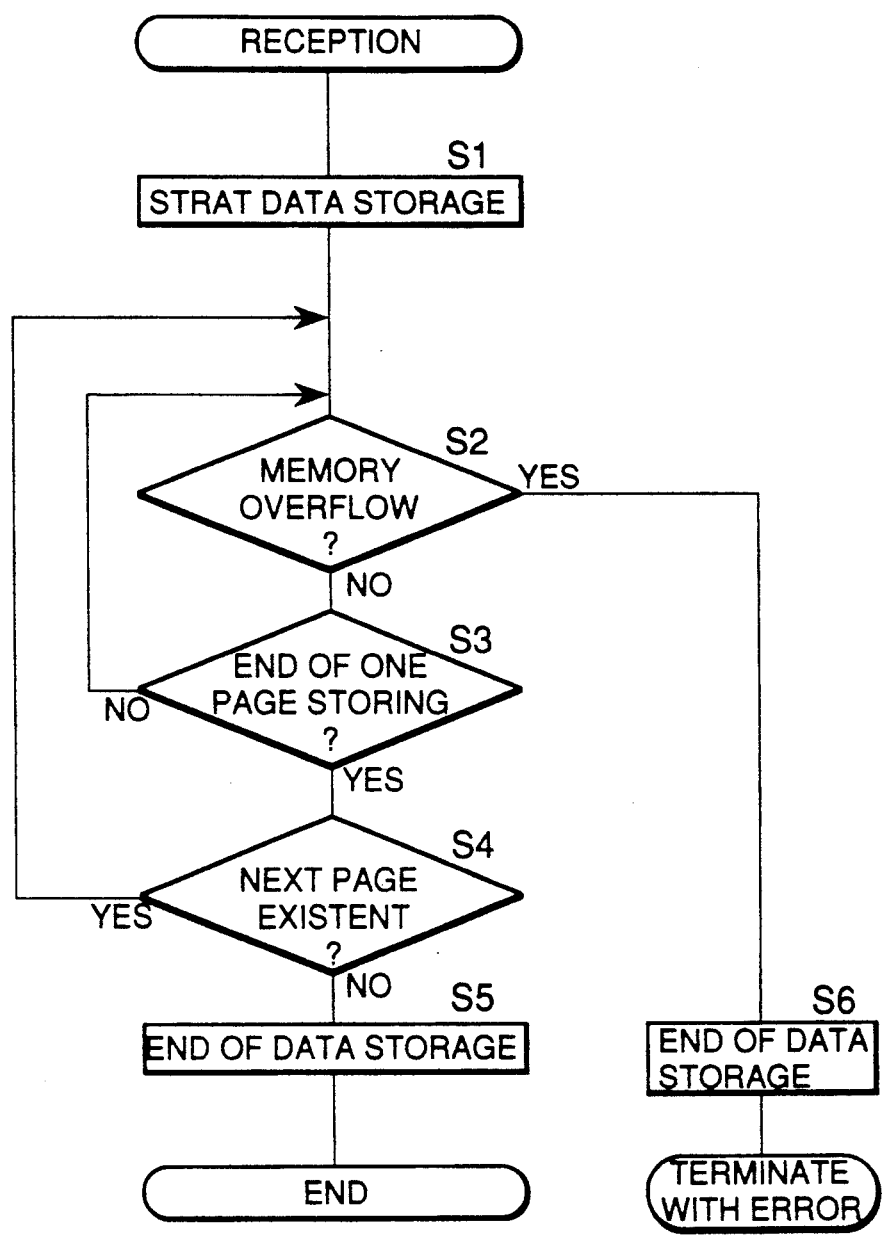
FIG. 2 shows a flow chart of a reception process in the embodiment.

FIG. 2 shows a flow chart of a reception process (control operation of the main controller 1) in the embodiment.

When the image information is received, the semiconductor memory 30 starts to store the received image information by a command from the main controller 1 (S1), and if the semiconductor memory 30 is not in the over-capacity state (S2), whether the storing of the image information has been completed for one page of document sheet or not is determined (S3). If it has been completed, whether there is image information to be continuously received or not, that is, whether there is next page to be received or not is determined (S4). If there is no image information to be received, the storing of the image information is terminated (S5) and the reception process is terminated.

If the storing of one page of document sheet has not been completed (S3) or if there is document sheet to be stored (S4), the storing of the image information is continued. Whether the storing of the image information for one page of document sheet has been completed or not (S3) and whether there is document sheet to be stored or not (S4) may be determined by a command signal after a message according to the CCITT Recommendation T.30, for example, if the communication follow the Recommendation.

If the semiconductor memory 30 is in the over-capacity state (S2), the storing of the image information is terminated (S6) and the reception is stopped by termination with error. The decision as to whether the semiconductor memory 30 is in the over-capacity state or not will be explained later.

Figure 3:
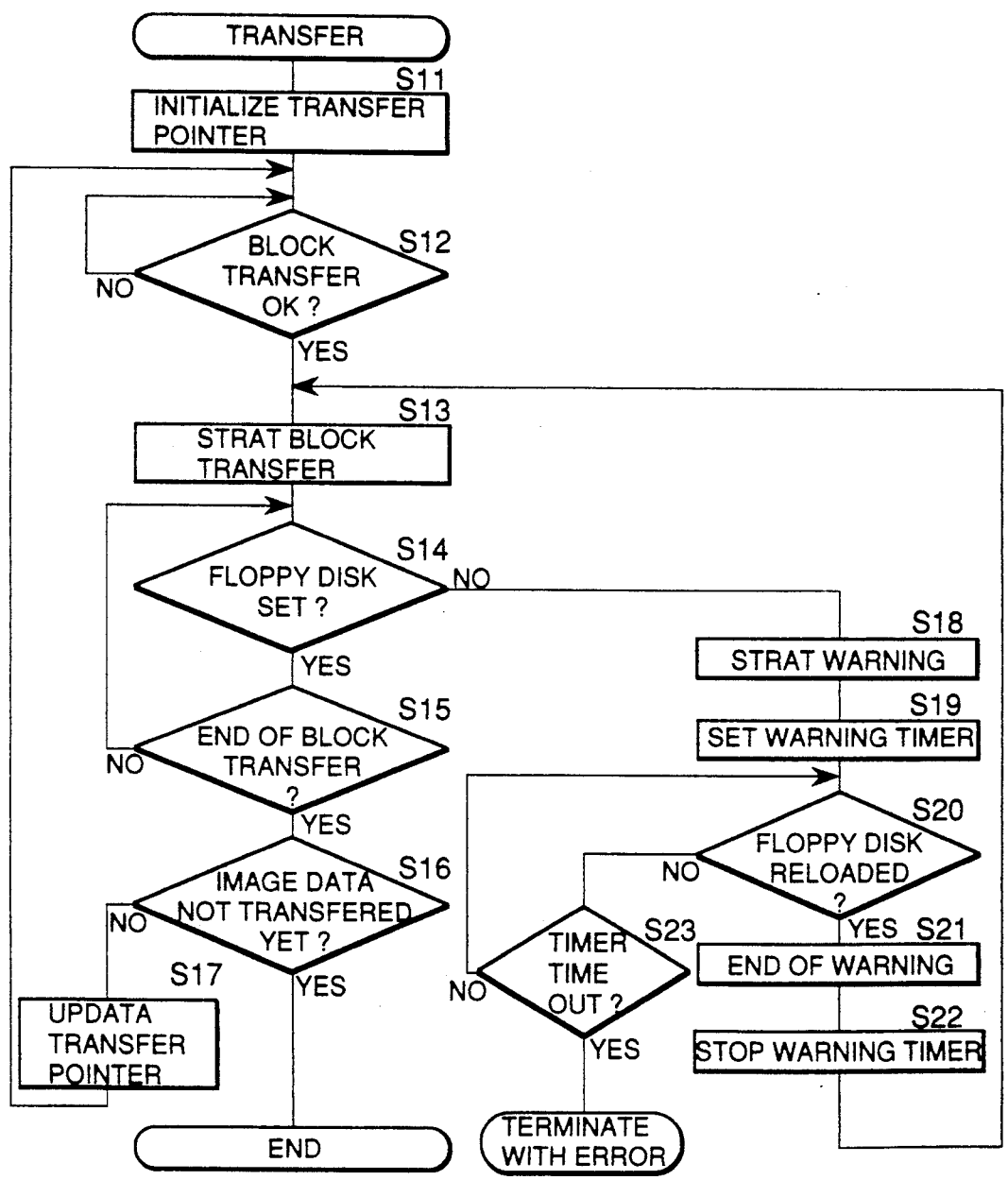
FIG. 3 shows a flow chart of a transfer process in the embodiment.

FIG. 3 shows a flow chart of a transfer process from the semiconductor memory 30 to the floppy disk 41 in the embodiment.

The main controller 1 stores a start address of a start block in the semiconductor memory 30 which stores no image information, into the transfer pointer 22 to initialize the transfer pointer 22 (S11). If the block transfer is permitted (S12), the main controller 1 starts the block transfer of the block pointed by the transfer pointer 22, from the semiconductor memory 30 to the floppy disk 41 (S13). Namely, the transfer of the image information from the semiconductor memory 30 to the floppy disk 41 is started.

If the floppy disk 41 is loaded in the disk drive 40 (S14), the block transfer is continued.

When one block of block transfer has been completed (S15), whether there is untransferred stored image information in the semiconductor memory 30 or not is determined. If there is no such image information (S16), the transfer process is terminated. If there is such image information (S16), the transfer pointer 22 is updated (S17) and next block is transferred or the process stands by until the block transfer is permitted.

If the main controller 1 determines the unloading of the floppy disk 41 from the disk drive 40 by the load/unload signal from the sensor 40s of the disk drive 40 during the block transfer (S14), the block transfer is interrupted. A visual alarm is issued to the operator by the display 6 (S18). Thus, the operator may quickly reload the floppy disk 41 during the interruption of the transfer. Accordingly, even if the volume of the image information to be received after the interruption of the transfer is large, a probability of the interruption of the reception due to the over-capacity of the semiconductor memory 30 is lowered.

Alarm sound means such as a speaker may be provided instead of the display 6 to generate an alarm sound during the interruption of the transfer of the image information.

After the start of the alarm, an alarm timer is set (S19) to set an alarm time. When the floppy disk 41 is reloaded to the disk drive 40 (S20), the alarm is terminated (S21), the alarm timer is stopped (S22) and the block transfer is resumed (S13).

If the timer is timed out (S23) while the floppy disk 41 is not reloaded (S20), the process is terminated with error. If the timer is not timed out yet (S23), the alarm is continuously issued to request the reloading of the floppy disk 41.

The reception process of FIG. 2 and the transfer process of FIG. 3 may be effected by separate microcomputers, or they may be effected by one microcomputer in a time-division fashion so that it appears that they are parallelly effected.

Figures 1, 2, 3, 4:
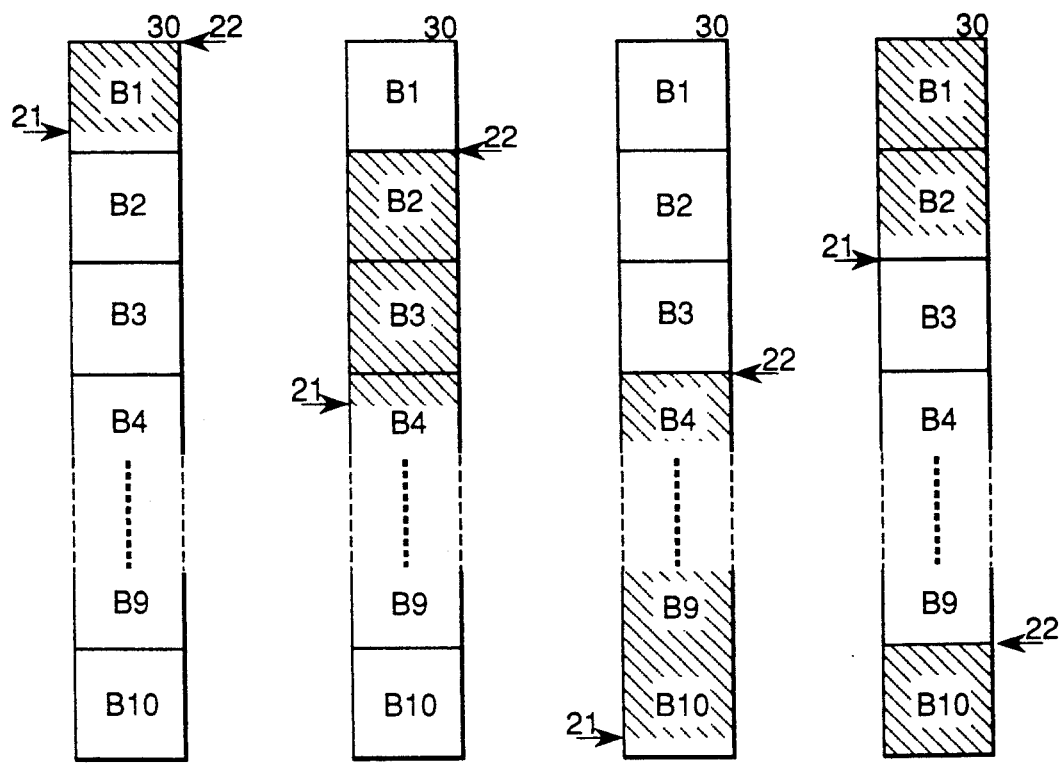

FIG. 4 shows a relationship between the storing of the received image information and the block transfer in the semiconductor memory 30 of the embodiment.

The main controller 1 stores the start address of the start block of the semiconductor memory 30 in which no image memory is stored, into the image information memory address pointer 21 and the transfer pointer 22 to initialize the image information memory address pointer 21 and the transfer pointer 22. When the storing of the received image information is started, the content of the image information memory address pointer 21 is incremented as the image information is stored. It is now assumed that the storing of the image information has been proceeded to the middle of the block B1. The image information memory address pointer 21 now points an address in the middle of the block B1 and the transfer pointer 22 points the start address of the block B1. Namely, the transfer of the block B1 is not permitted because one block of image information has not been stored. FIG. 4-1 shows this condition.

As the storing of the image information proceeds and one block of image information has been stored, the transfer of the block is permitted. It is assumed that the storing of the image information has proceeded to blocks B2 and B3 and the middle of block B4, and that the transfer of the block B1 is completed during this period and the transfer of the block B2 is stopped by some reason. Accordingly, the image information memory address pointer 21 points an address in the middle of the block B4 and the transfer pointer 22 still points the start address of the block B2. FIG. 4-2 shows this condition.

It is assumed that the storing of the image information further proceeds to the middle of block B10, and the transfer of the blocks B2 and B3 has been completed during this period. The image information memory address pointer 21 points an address in the middle of the block B10 and the transfer pointer 22 points the start address of the block B4. This condition is shown by FIG. 4-3.

If the image information is stored up to the end of the block B10 and there is still image information to be continuously stored, the content of the image information memory address pointer 21 is returned to the start address of the block B1 whose block transfer has been completed and which is now an empty block, and the storing of the image information is continued to that block. It is assumed that the storing of the image information has been completed to the middle of the block B2, and the block transfer of the blocks B4 to B9 has been completed. Accordingly, the image information memory address pointer 21 points an address in the middle of the block B2 and the transfer pointer 22 points the start address of the block B10. This condition is shown in FIG. 4-4.

In the reception process of FIG. 2, the over-capacity state is detected when the content of the image information memory address pointer 21 catches up the content of the transfer pointer 22. When the content of the image information memory address pointer 21 and the storing of the image information is further continued, the image information which has not yet been transferred to the floppy disk 41 may be erased.

In the transfer process of FIG. 3, the block transfer is permitted when the content of the transfer pointer 22 plus one block size does not reach the content of the image information memory address pointer 21. When the content of the transfer pointer 22 plus one block size exceeds the content of the image information memory address pointer 21, it means that the storing of one block of image information has not been completed.

In the present embodiment, if the floppy disk 41 is unloaded from the disk drive 40 during the transfer of the image information from the semiconductor memory 30 to the floppy disk 41, the alarm is issued so that the operator may quickly reload the floppy disk 41. Accordingly, even if the volume of the image information to be received after the interruption of the transfer is large, a probability of the interruption of the reception due to the over-capacity of the semiconductor memory 30 is lowered.

The alarm may also be issued when the floppy disk 41 is unloaded from the disk drive after the transfer of the image information from the semiconductor memory 30 to the floppy disk 41. In this case, a probability of the interruption of the reception due to the over-capacity of the semiconductor memory 30 which may occur in the subsequent reception can be lowered. In this case, the alarm may be issued at the start of the next reception.

When the floppy disk 41 is unloaded from the disk drive 40 and reloaded during the transfer of the image information from the semiconductor memory 30 to the floppy disk 41, the label title of the floppy disk 41 may be examined to determine if the floppy disk 41 unloaded from the disk drive 40 is identical to the reloaded floppy disk 41, and if it is not identical, an alarm may be issued to request the reloading of the identical floppy disk 41.

In accordance with the present embodiment, the operator may quickly reload the floppy disk after the interruption of the transfer and the probability of the interruption of the reception due to the over-capacity of the semiconductor memory can be lowered.

The present invention is not limited to the above embodiment but various modifications thereof may be made.

I claim:

1. An image communication apparatus for storing received image data in first storage means and transferring the image data stored in said first storage means to a second unloadable storage means that may be loaded to or unloaded from said apparatus, comprising:
   detection means for detecting a load/unload status of said second storage means indicating that said second storage means is loaded to/unloaded from said apparatus, respectively; and
   control means for controlling the transfer of the image data from said first storage means to said second storage means in accordance with the detection output of said detection means,
   said control means interrupting the transfer of the image data when the unload status of said second storage means is detected by said detection means during the transfer of the image data and resuming the interrupted transfer of the image data when the load status of said second storage means is detected by said detection means after the interruption.

2. An image communication apparatus according to claim 1 further comprising:
   means for issuing an alarm when the transfer of the image data is interrupted.

3. An image communication apparatus according to claim 1 further comprising:
   third storage means for storing information to control the transfer of the image data,
   said control means controlling the transfer of the image data in accordance with the information stored in said third storage means.

4. An image communication apparatus according to claim 1 wherein said first storage means is a semiconductor memory.

5. An image communication apparatus for storing received image data in a first storage means and transferring the image data stored in said first storage means to an unloadable storage medium that may be loaded to or unloaded from said apparatus, comprising:
   detection means for detecting a load/unload status of said storage medium indicating that said storage medium is loaded to/unloaded from said apparatus, respectively;
   alarm means for generating an alarm to request reloading of said storage medium; and
   control means for controlling the transfer of the image data from said first storage means to said storage medium in accordance with the detection output of said detection means,
   said control means interrupting the transfer of the image data and causing said alarm means to generate the alarm when the unload status of said storage medium is detected by said detection means during the transfer of the image data, and resuming the interrupted transfer of the image data when the load status of said storage medium after reloading is detected by said detecting means after the interruption of the transfer of the image data.

6. An image communication apparatus according to claim 5 further comprising:
   second storage means for storing information to control the transfer of the image data,
   said control means resuming the transfer of the image data in accordance with the information stored in said second storage means.

7. An image communication apparatus according to claim 5 wherein said storage medium is a floppy disk.

8. An image communication apparatus according to claim 5 wherein said first storage means is a semiconductor memory.

9. A method for storing received image data in first storage means and transferring the image data stored in the first storage means to an unloadable storage medium that may be loaded or unloaded, comprising the steps of:

detecting a load/unload status of the storage medium;

interrupting the transfer of the image data when the storage medium is unloaded during the transfer of the image data; and resuming the interrupted transfer of the image data in response to loading of the storage medium when the storage medium is reloaded.

10. A method according to claim 9 further comprising the step of:

generating an alarm to request the reloading of said storage medium when the transfer of the image data is interrupted.

11. A method according to claim 9 further comprising the steps of:

holding information for controlling the transfer of the image data; and resuming the transfer of the image data in accordance with the held information.

12. A method according to claim 9 wherein the storage medium is a floppy disk.

13. A method according to claim 9 wherein the first memory means is a semiconductor memory.

* * * * *